March 18, 1941.  H. HORNSCHUCH  2,235,684
LOCKING DEVICE
Filed Nov. 10, 1938
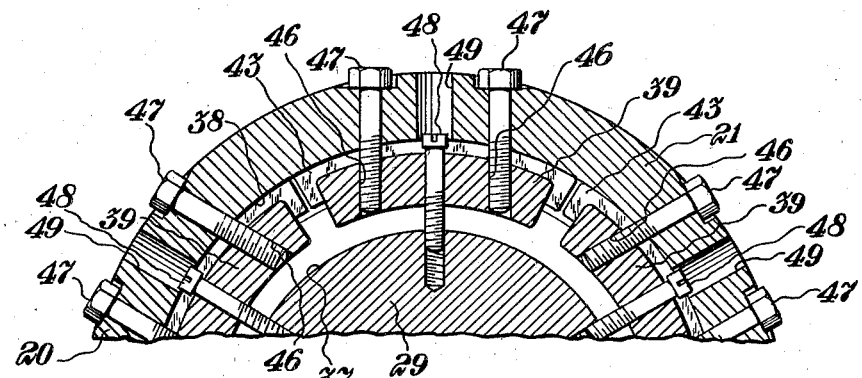
FIG.-2.
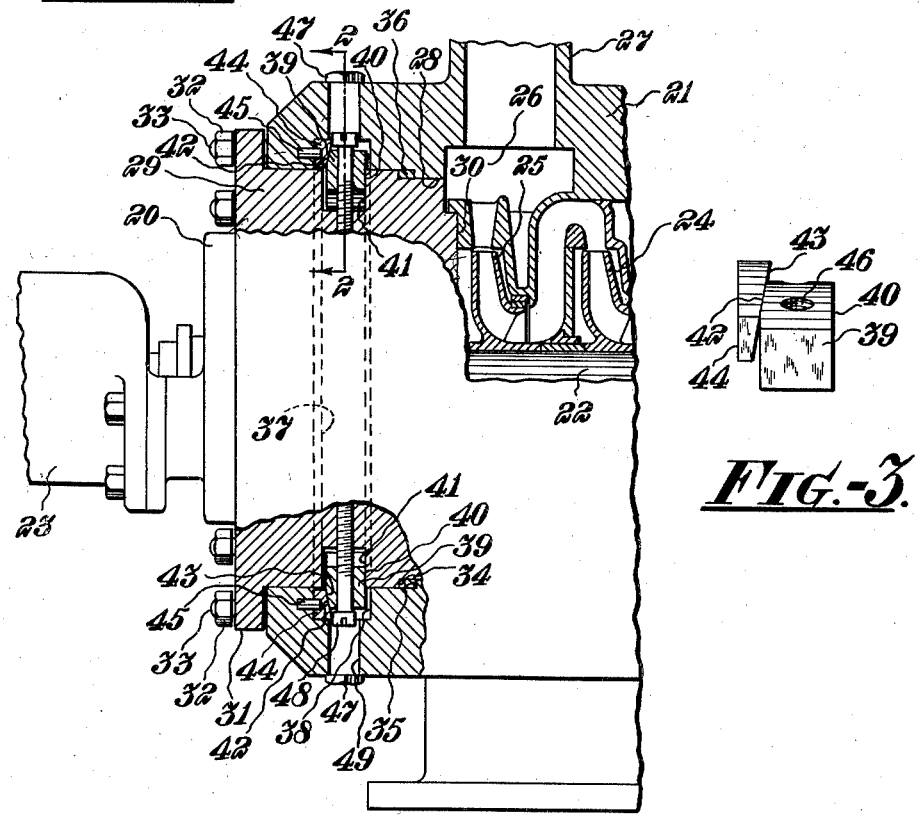
FIG.-3.
FIG.-1.
INVENTOR
Hanns Hornschuch
BY
HIS ATTORNEY Patented Mar. 18, 1941

2,235,684

UNITED STATES PATENT OFFICE 2,235,684

LOCKING DEVICE

Hanns Hornschuch, Easton, Pa., assignor to Ingersoll-Rand Company, Jersey City, N. J., a corporation of New Jersey Application November 10, 1938, Serial No. 239,749

2 Claims. (Cl. 220—55)

This invention relates to pumps, and more particularly to a locking device for securing together telescopically arranged parts, as for example the outer casing of a pump and a head forming a closure for the pumping chamber.

More particularly the invention is intended for use in pumps operating at high pressures in which the head-securing means are necessarily required to withstand heavy strains.

In accordance with the present invention, it is contemplated to employ bolts, in the conventional manner, for locating and disposing the head in substantially the correct position in the casing and through the use of suitable locking elements to lock the head securely to the casing and thereby relieve the bolts of the strain of resisting the pressure of the liquid being pumped.

One object of the invention is to enable the casing parts of the pump to be securely and expeditiously locked together.

Another object is to avoid subjecting the casing bolts to the pressure of the liquid being pumped.

Other objects will be in part obvious and in part pointed out hereinafter.

In the drawing accompanying this specification and in which similar reference numerals refer to similar parts, Figure 1 is a longitudinal elevation, partly in section, of a pump of which the casing parts are secured together by a locking device constructed in accordance with the practice of the invention, Figure 2 is a transverse view taken through Figure 1 on the line 2—2, and Figure 3 is a side elevation of a detail.

Referring more particularly to the drawing, 20 designates, in general, a pump comprising a casing 21 and a shaft 22 extending through the casing. The shaft 22 is supported by suitable bearings 23, of which only one is shown, and carries a pair of impellers 24 and 25. The latter is the final stage impeller and the liquid discharged therefrom enters a discharge chamber 26, whence it may pass to a point of utilization through a discharge conduit 27.

The bore 28 in the casing 21 containing the impellers extends entirely through the casing, and in the outer end if the bore is a head 29 which forms a closure for the casing and terminates adjacent the impeller 25 so that the inner end surface 30 of the head 29 is subjected to the final discharge pressure of the pump. The head 29 has a lateral flange 31 to act as an abutment for nuts 32 threaded on bolts 33 extending through the flange and threaded into the end of the casing 21 for locating the head in the casing and initially securing the head in position.

On the portion of the head 29 lying within the casing 21 is a shoulder 34 which is spaced a suitable distance from a shoulder 35 in the bore 28, and a gasket 36 encircling the head is compressed between the shoulders 34 and 35 to prevent leakage of fluid along the head 29 to the exterior of the pump.

The gasket 36 is preferably located near the inner end of the head and, in accordance with the practice of the invention, the portions of the head 29 and the casing 21 lying between the gasket and the end of the casing are provided with annular registering grooves 37 and 38, respectively, to receive locking elements 39 for locking the head 29 to the casing 21. The groove 37 is of a depth to entirely receive the locking elements 39 so that the outer surfaces of the locking elements may lie flush with or below the peripheral surface of the head 29.

The locking elements 39 are in the form of segments of less width than the annular groove 37 and in their locking positions engage with their innermost sides 40 the adjacent innermost surface or shoulder 41 of the groove 37. On the opposite sides of the locking elements adjacent their peripheral surfaces are inclined surfaces 42 to seat against and engage correspondingly shaped surfaces 43 of wearing blocks 44 arranged in the outermost side of the groove 37 upon locating pins 45 seated in the casing 21.

The locking elements 39 are movable radially in the grooves 37 and 38 and, to this end, are provided with threaded apertures 46 to accommodate bolts 47 which extend loosely through the casing 21 to its periphery so that they may be conveniently engaged with a wrench for rotating them. The bolts 47 serve to draw the locking elements 39 into the groove 38 for placing said locking elements in the locking positions.

Bolts, designated 48, are also provided for actuating the locking elements into non-locking position and holding them thus against the bottom of the groove 37 so that the head 29 may be conveniently inserted into and removed from the casing 21 without hindrance from the locking elements. Only one bolt 48 is provided for each locking element 39 and extends loosely through the intermediate portion of the locking element and is threaded into the head 29. Suitable apertures 49 are provided in the wall of the casing 21 to permit the insertion of an implement for rotating the bolts 48.

In practice, whenever it is intended to insert the head 29 in and lock it to the casing 21, the locking elements 39 are first placed in the groove 37 and secured to the bottom thereof by the bolts 48. The gasket 36 is then placed about the head 29 and the latter is inserted into the bore 28. The nuts 32 are next threaded on the bolts to draw the head 29 in substantially the correct operative position and to fully compress the gasket 36. Thereafter, the bolts 48 are unthreaded to release the locking elements 39 and the bolts 47 are manipulated to draw the locking elements part way into the groove 38. During this movement of the locking elements the wedging effect obtained through the cooperation of the surfaces 42 and 43 and the pressure of the locking elements against the surface 41 of the groove 37 will urge the head 29 toward the impellers.

In this position the locking elements will extend part way into the groove 38 and partly into the groove 37 and will seat firmly against the casing elements so that when the surface 30 of the head 29 is exposed to the pressure of the liquid being pumped this force will be resisted by the locking elements instead of by the bolts 33.

I claim:

1. In combination, outer and inner members in telescopic engagement with each other and said members having registering annular recesses, locking elements in the recess of the inner member seating against a side surface of the recess in said inner member, an inclined surface on one side of the recess in the outer member, bolts in the periphery of the outer member threadedly engaging the locking elements for drawing the locking elements radially outwardly along the inclined surface to lock the members together, and bolts in the locking elements threaded into the inner member for actuating the locking elements out of engagement with the outer member and for securing the locking members in the annular recess of the inner member.

2. In combination, outer and inner members in telescopic engagement with each other and said members having registering annular recesses, locking elements in and of less width than the annular recess in the inner member seating against a side surface of the recess in the inner member, an inclined surface on one side of the recess in the outer member, bolts extending loosely through the wall of the outer member threadedly engaging the locking elements for drawing the locking elements along the inclined surface to lock the members together, and bolts extending loosely through the locking elements threadedly engaging the inner member to move the locking elements out of the annular recess in the outer member and to lock the locking elements in the annular recess in the inner member, there being apertures in the outer member to admit of access to the last mentioned bolts.

HANNS HORNSCHUCH.